L. KINES.
MILK BOTTLE.
APPLICATION FILED OCT. 4, 1919.

1,329,975. Patented Feb. 3, 1920.

WITNESSES
J H Crawford

INVENTOR.
BY Laura Kines,
Victor J. Evans
ATTORNEY.

UNITED STATES PATENT OFFICE.

LAURA KINES, OF DETROIT, MICHIGAN.

MILK-BOTTLE.

1,329,975.  Specification of Letters Patent.  Patented Feb. 3, 1920.

Application filed October 4, 1919. Serial No. 328,350.

*To all whom it may concern:*

Be it known that I, LAURA KINES, a citizen of the United States, residing at Detroit, in the county of Wayne and State of Michigan, have invented new and useful Improvements in Milk-Bottles, of which the following is a specification.

This invention has reference to an improved milk bottle or container, and has for its primary object to produce a receptacle of this character whereby the cream may be drawn out of the receptacle without interfering with the milk therein.

The foregoing object, and others which will appear as the nature of the invention is better understood, may be accomplished by a simple construction, combination and operative arrangement of parts, such as is illustrated by the accompanying drawings.

Figure 1:
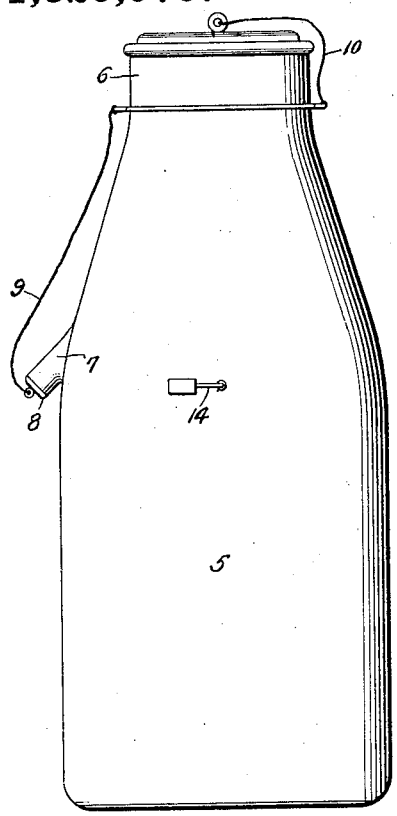
Figure 1 is a side elevation of the improvement.
Figure 2:
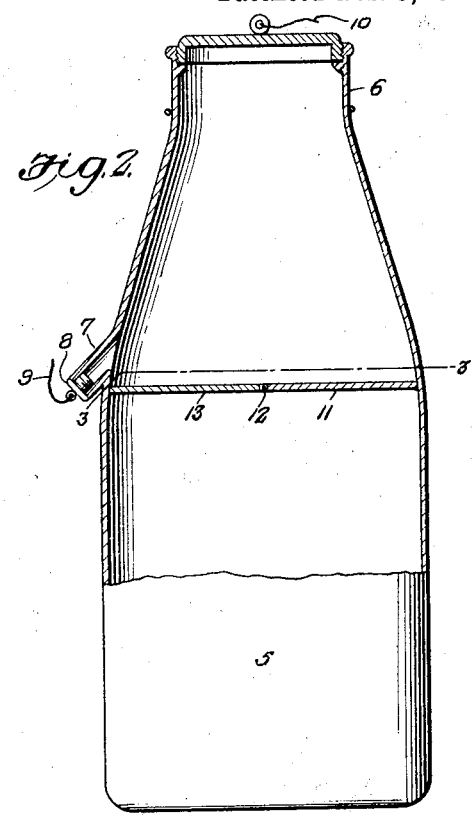
Fig. 2 is a substantially vertical transverse sectional view taken centrally through the cream outlet spout of the bottle.
Figure 3:
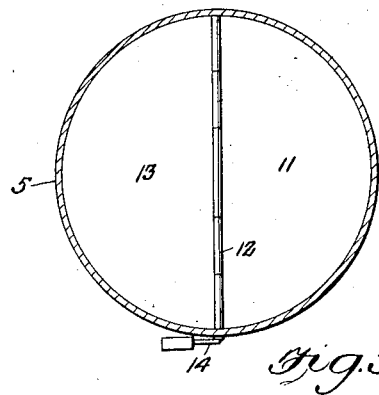
Fig. 3 is a horizontal sectional view approximately on the line 3—3 of Fig. 2.
Figure 4:
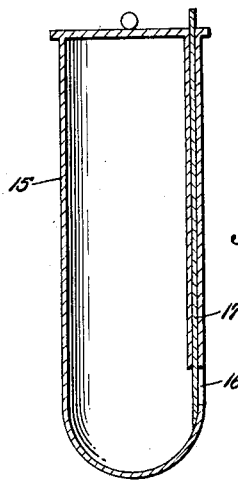
Fig. 4 is a central vertical longitudinal sectional view through a dipper which may be employed.

The body of the bottle or receptacle, indicated by the numeral 5 is, of course, larger than the neck 6 thereof, but in the present instance the neck may be comparatively large. The neck 6, at the juncture of the body 5, is formed with a downwardly arranged angularly extending spout 7 that is normally closed by a stopper 8. The stopper 8 is suspended by a flexible element 9 from the neck of the bottle, and the neck is also closed by a stopper which is likewise suspended from a flexible element 10 that is also secured on the neck of the bottle.

Formed in the body of the bottle below the outlet spout is a horizontally disposed ledge 11. This ledge extends approximately one-half of the width of the bottle and to the outer and straight edge thereof there is hinged, as at 12 a door 13 that has its outer periphery rounded so that the same can be brought into frictional contact with the inner wall of the body below the spout. The pintle for the hinge 12 extends through one of the sides of the bottle, and has an offset connection with the door 13, the projecting portion of the said pintle providing a handle 14 whereby the door may be swung against the bottle or permitted to swing downwardly in the bottle.

The milk is arranged in the bottle and the cream rising to the surface thereof will be disposed in a line with the ledge 11. The stopper for the outlet spout is withdrawn, but the stopper for the neck of the bottle is arranged therein. The door 13, when it is desired to draw off the cream from the bottle is swung to closed position and the cream is thus allowed to flow through the outlet spout. After the cream has been drawn off the stopper for the spout is applied and when the milk is to be poured from the bottle the stopper in the neck thereof is removed and the bottle tilted in the usual manner.

In some instances I have found it desirable to draw only a determined quantity of milk or cream from the bottle, and under such conditions I employ a dipper which is broadly indicated by the numeral 15. This dipper has its side provided with an opening 16 that is regulated by a slidable door 17. When the door is open, of course, the milk or cream will be permitted to flow into the dipper and the dipper is of a length to permit of the free insertion thereof through the mouth of the bottle.

It is thought from the foregoing description, when taken in connection with the drawings, the simplicity of the construction and the advantages thereof will be readily apparent without further detailed description.

Having thus described the invention, what is claimed as new, is:—

A milk bottle or receptacle having a reduced neck provided with an angularly disposed outlet spout, a stopper for the spout, a stopper for the neck of the bottle, a horizontally disposed ledge in the body of the bottle slightly below the spout thereof, a door hinged to said ledge, an operating handle for the door arranged exteriorly of and on one side of the bottle, and said door when in one position designed to frictionally contact with the inner wall of the bottle whereby, in connection with the ledge to close the body of the bottle below the spout thereof.

In testimony whereof I affix my signature.

LAURA KINES.